US012466131B2

(12) United States Patent
Ackelid (10) Patent No.: US 12,466,131 B2
(45) Date of Patent: Nov. 11, 2025

(54) PREHEATING OF POWDER BED (71) Applicant: Freemelt AB, Mölndal (SE)

(72) Inventor: Ulf Ackelid, Gothenburg (SE)

(73) Assignee: Freemelt AB, Mölndal (SE)

( * ) Notice: Subject to any disclaimer, the term of this patent is extended or adjusted under 35 U.S.C. 154(b) by 195 days.

(21) Appl. No.: 17/918,294

(22) PCT Filed: Apr. 16, 2021

(86) PCT No.: PCT/SE2021/050352
§ 371 (c)(1),
(2) Date: Oct. 11, 2022

(87) PCT Pub. No.: WO2021/211049
PCT Pub. Date: Oct. 21, 2021

(65) Prior Publication Data
US 2023/0150201 A1 May 18, 2023

(30) Foreign Application Priority Data
Apr. 17, 2020 (SE) .................................. 2050445-2

(51) Int. Cl.
*B29C 64/295* (2017.01)
*B22F 10/28* (2021.01)
(Continued)

(52) U.S. Cl.
CPC ............ *B29C 64/295* (2017.08); *B22F 10/28* (2021.01); *B22F 12/13* (2021.01); *B29C 64/153* (2017.08);
(Continued)

(58) Field of Classification Search
CPC ..... B29C 64/153; B29C 64/295; B22F 10/28; B22F 12/13; B22F 12/22; B22F 12/60;
(Continued)

(56) References Cited

U.S. PATENT DOCUMENTS

2008/0131104 A1  6/2008 Philippi
2016/0288266 A1  10/2016 Rockstroh et al.
(Continued)

FOREIGN PATENT DOCUMENTS

CA    3068408 A1   1/2019
CN   106346779 A   1/2017
(Continued)

OTHER PUBLICATIONS

Supplementary Search Report and Search Opinion Received for EP Application No. 21789392.4, mailed on Dec. 1, 2023, 9 pages.
(Continued)

*Primary Examiner* — Galen H Hauth
*Assistant Examiner* — Baileigh Kate Darnell
(74) *Attorney, Agent, or Firm* — MEDLER FERRO WOODHOUSE & MILLS PLLC (57) ABSTRACT

An arrangement for additive manufacturing by selective fusion of layers of a three-dimensional product from a powder bed including successively formed powder layers is provided. The arrangement includes a heating element having a powder layer facing surface, arranged in a powder layer heating position above a powder layer, in such a way that heat radiation emitted from said heating element heats at least a part of the powder layer before the selective fusion of a layer of the three-dimensional product from the powder layer.

12 Claims, 5 Drawing Sheets (51) Int. Cl.
  *B22F 12/13* (2021.01)
  *B29C 64/153* (2017.01)
  *B33Y 10/00* (2015.01)
  *B33Y 30/00* (2015.01)
  *B33Y 40/10* (2020.01)
(52) U.S. Cl.
  CPC ............... *B33Y 10/00* (2014.12); *B33Y 30/00* (2014.12); *B33Y 40/10* (2020.01)
(58) Field of Classification Search
  CPC ......... B33Y 10/00; B33Y 30/00; B33Y 40/10; B28B 1/001
  See application file for complete search history.

(56) References Cited

U.S. PATENT DOCUMENTS

| | | | |
|---|---|---|---|
| 2017/0021456 A1 | 1/2017 | Varetti | |
| 2017/0129181 A1 | 5/2017 | Kunioka | |
| 2018/0133975 A1 | 5/2018 | Zhao et al. | |
| 2018/0147654 A1 | 5/2018 | Kitamura et al. | |
| 2018/0311759 A1* | 11/2018 | Ackelid | B29C 64/264 |
| 2020/0031049 A1 | 1/2020 | Huang et al. | |
| 2020/0346407 A1 | 11/2020 | Goodwin et al. | |
| 2022/0161331 A1 | 5/2022 | Shimizu et al. | |
| 2022/0194216 A1 | 6/2022 | Matsuo et al. | |

FOREIGN PATENT DOCUMENTS

| | | |
|---|---|---|
| CN | 107379527 A | 11/2017 |
| CN | 110757790 A | 2/2020 |
| DE | 102017125597 A1 | 5/2019 |
| DE | 102017222645 A1 | 6/2019 |
| EP | 3248717 A1 | 11/2017 |
| JP | 2008-542529 A | 11/2008 |
| JP | 2015-120340 A | 7/2015 |
| JP | 2017-087562 A | 5/2017 |
| JP | 2018-513798 A | 5/2018 |
| JP | 2019-007051 A | 1/2019 |
| JP | 2019-064090 A | 4/2019 |
| JP | 2020-015296 A | 1/2020 |
| JP | 2020-023062 A | 2/2020 |
| WO | 92/08592 A1 | 5/1992 |
| WO | 2018/193744 A1 | 10/2018 |
| WO | 2018/194481 A1 | 10/2018 |
| WO | 2019/004857 A1 | 1/2019 |
| WO | 2019/031979 A1 | 2/2019 |
| WO | 2019/086379 A1 | 5/2019 |
| WO | 2019/115140 A1 | 6/2019 |
| WO | WO-2019133552 A1 | 7/2019 |
| WO | WO-2020203992 A1 | 10/2020 |

OTHER PUBLICATIONS

International Preliminary Report on Patentability received for PCT Patent Application No. PCT/SE2021/050352, mailed on Oct. 27, 2022, 10 pages.

International Search Report and Written Opinion received for PCT Patent Application No. PCT/SE2021/050352, mailed on May 18, 2021, 13 pages.

* cited by examiner

PREHEATING OF POWDER BED

CROSS-REFERENCE TO PRIOR APPLICATIONS

This application is a § 371 National Stage Application of PCT International Application No. PCT/EP2021/050352 filed Apr. 16, 2021, which claims priority to Swedish Patent Application No. 2050445-2, filed Apr. 17, 2020, both of which are incorporated herein in their entirety.

TECHNICAL FIELD

The present disclosure relates generally to arrangements and methods for additive manufacturing by selective fusion of layers of a three-dimensional product from a powder bed comprising successively formed powder layers.

BACKGROUND

When an electron beam interacts with a powder bed during electron beam powder bed fusion, electrons from the electron beam may build up an electric charge in the powder grains of the powder bed. If the electrical conductivity of the powder bed is too low to dissipate the electric charge induced by the electron beam, the powder bed will accumulate charges up to a critical value where repelling electrostatic forces between the powder grains exceed the gravitational forces, causing the powder grains to levitate from the powder bed. Levitated charged powder grains repel from other levitated charged powder grains, and thus a powder cloud may instantaneously spread throughout the manufacturing chamber. This phenomenon may lead to an immediate failure and termination of the additive manufacturing process.

In order to lower the risk of this happening, the powder bed may be preheated to prepare proper process conditions for the subsequent fusion and solidification steps. The main purpose of such preheating of the powder bed is to achieve a semi-sintered powder bed for increased electrical and heat conduction. A semi-sintered powder bed will also better resist levitation and scattering of charged powder.

PROBLEMS WITH THE PRIOR ART

In additive manufacturing based on electron beam powder bed fusion, it is possible to preheat each new powder layer by scanning the electron beam spot over the powder bed in a predetermined pattern designed to avoid build-up of excessive electric charge in the powder bed. The beam scanning speed must be sufficiently high so that the powder only heats up to a temperature where it semi-sinters, but does not melt. The preheating scan pattern can be repeated several times, if needed, to reach a semi-sintered state of the powder bed. Once the powder bed is semi-sintered, the electron beam can start melting the powder layer without risk of levitation and scattering of charged powder.

This way of preheating may work well for some metal powders, but for e.g. powders with low electric conductivity and/or small particle size, it may be extremely difficult, or even impossible, to find suitable preheating parameters. This is the case also for small preheating areas.

Another problem with this way of preheating is that it is difficult to get an even degree of semi-sintering in the powder bed. Preheating with a scanning electron beam spot directly onto the powder bed will usually create more semi-sintering along the scanning lines and less semi-sintering in-between the scanning lines.

Yet another problem with this way of preheating is that the packing density of semi-sintered powder becomes quite low when it is heated by direct impact of an electron beam. This is because the electron beam makes the powder particles move a little bit before they semi-sinter. A low packing density of the powder bed is generally considered a disadvantage in additive manufacturing, because it affects the quality of built components.

There is thus a need for improved arrangements and methods for additive manufacturing by selective fusion of layers of a three-dimensional product from a powder bed comprising successively formed powder layers.

SUMMARY

The above described problem is addressed by the claimed arrangement for additive manufacturing by selective fusion of layers of a three-dimensional product from a powder bed comprising successively formed powder layers. The arrangement may comprise a heating element having a powder layer facing surface, arranged in a powder layer heating position above a powder layer, in such a way that heat radiation emitted from said heating element heats at least a part of the powder layer before the selective fusion of a layer of the three-dimensional product from the powder layer. In such an additive manufacturing arrangement, the powder layer may be preheated in a simple, efficient and uniform way. The powder layer facing surface may be essentially flat and parallel to at least a part of the powder layer, but other shapes are conceivable, as long as the heating element can emit heat radiation towards the powder layer.

In embodiments, the heating element is arranged to be moveable from the powder layer heating position to a resting position before the selective fusion of a layer of the three-dimensional product from the powder layer.

In embodiments, the arrangement comprises a powder distributing member arranged to distribute powder to form the powder layer, wherein the powder distributing member is arranged to move the heating element between the powder layer heating position and the resting position. This reduces the number of movable actuators.

In embodiments, the arrangement comprises a heating device arranged to heat the heating element in the resting position using IR heating, resistive heating, inductive heating, laser beam heating, electron beam heating (e.g. by a separate electron beam), and/or conductive heating by physical contact with the heating element. In embodiments, the heating element comprises the heating device.

In embodiments, the heating element is surrounded by heat reflecting devices in the resting position, so that the cooling rate of the heating element is reduced. Such heat reflecting devices may e.g. comprise single or multiple layers of metal foil.

The above described problem is further addressed by the claimed method for heating a powder layer in connection with additive manufacturing by selective fusion of layers of a three-dimensional product from a powder bed comprising successively formed powder layers. The method may comprise: arranging a heating element having a powder layer facing surface in a powder layer heating position above a powder layer; and heating at least a part of the powder layer with heat radiation from said heating element before the selective fusion of a layer of the three-dimensional product. Such a method may be used to preheat the powder layer in a simple, efficient and uniform way. The powder layer facing surface may be essentially flat and parallel to at least a part of the powder layer, but other shapes are conceivable, as long as the heating element can emit heat radiation towards the powder layer.

In embodiments, the method comprises moving the heating element from the powder layer heating position to a resting position before the selective fusion of a layer of the three-dimensional product from the powder layer.

In embodiments, the heating element is moved between the powder layer heating position and the resting position using a powder distributing member arranged to distribute powder to form the powder layer. This reduces the number of movable actuators.

In embodiments, the method comprises heating the heating element in the resting position using IR heating, resistive heating, inductive heating, laser beam heating, electron beam heating, and/or conductive heating by physical contact with the heating element.

In embodiments, the heating element is surrounded by heat reflecting devices in the resting position, so that the cooling rate of the heating element is reduced. Such heat reflecting devices may e.g. comprise single or multiple layers of metal foil.

In embodiments, the heating element is thermally insulated, to prevent heat loss.

In embodiments, the powder layer facing surface of the heating element is essentially parallel to areas of the at least one powder layer that correspond to cross sections of the three-dimensional product to be formed.

In embodiments, the powder layer heating position is in close proximity to the powder layer, such as e.g. less than 20 mm, and preferably less than 10 mm, above the powder layer, in order to transfer a uniform heat radiation to the powder layer.

In embodiments, the selective fusion of the three-dimensional product uses an energy beam, preferably an electron beam. The energy beam may also be e.g. a laser beam.

In embodiments, the energy beam is used for heating the heating element, preferably by heating an upper surface of the heating element that faces away from the powder layer.

In embodiments, the heating element is connected to a temperature sensor for measuring the temperature of the heating element. The measured temperature may be used as an overheating protection, and/or for feedback for controlling the electron beam or other heating system used for heating the heating element.

In embodiments, the upper surface of the heating element has a structure that increases the efficient area of the upper surface.

In embodiments, the upper surface of the heating element is coated with a material with lower efficiency of heat radiation than the material of the heating element.

In embodiments, the upper surface of the heating element is coated with a material with lower efficiency of electron emission than the material of the heating element.

In embodiments, the heating element is electrically grounded, to avoid build-up of electric charge in the heating element.

In embodiments, the powder layer facing surface of the heating element has essentially the same shape as the powder bed surface.

In embodiments, the heat radiation from the heating element is infrared radiation.

In embodiments, the heating element comprises a material with a high melting point, such as e.g. a refractory metal or graphite.

In embodiments, the heating element is kept at a positive potential, such as e.g. +60 kV, at least when the heating element is in the powder layer heating position. This may attract the energy beam and further increase its heating power, especially when the energy beam is an electron beam.

In embodiments, the heating element comprises a thin sheet or foil. This may decrease the time and energy required for heating the heating element, due to less mass. Such a thin sheet or foil is preferably arranged in some kind of frame for structural support, since a thin sheet or foil may otherwise be deformed during heating.

In embodiments, the powder layer facing surface of the heating element is coated with a material with higher efficiency of heat radiation than the material of the heating element.

In embodiments, the powder layer comprises powder material of any kind, such as e.g. powder composed of pure metal, metal alloys, intermetallics, ceramics, glass, graphite, diamond, composites, polymers, nanomaterials, ionic compounds, or any powder mixture thereof. The powder layer may comprise a conductive material, a semi-conductive material, an insulating material, or any mixture thereof. Thanks to the heating of the powder layer, also materials which are not particularly conductive may be used for powder bed fusion.

In embodiments, the heating element is used also for heating the powder layer after the selective fusion of a layer of the three-dimensional product from the powder layer.

In embodiments, the heating takes place in vacuum.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Additive manufacturing and 3D-printing refer to the process of manufacturing objects from 3D model data by joining powder materials layer upon layer. Powder bed fusion means additive manufacturing or 3D-printing where objects are built up in a powder bed. Thin layers of powder are repeatedly spread by a powder distributing member over a powder bed and fused by a beam from an energy source to a predetermined geometry for each layer. The powder bed is preferably lowered one powder layer thickness (e.g. 0,020-0,100 mm) before distribution of the next powder layer. The energy source can be for example a laser or an electron beam source (the term electron beam may when used herein comprise any charged particle beam). Upon finishing a powder bed fusion process, the fused object will be embedded in powder. The powder is removed after completion of the build.

The present disclosure relates generally to arrangements and methods for additive manufacturing by selective fusion of a three-dimensional product from a powder bed comprising successively formed powder layers. Embodiments of the disclosed solution are presented in more detail in connection with the figures.

Figure 1:
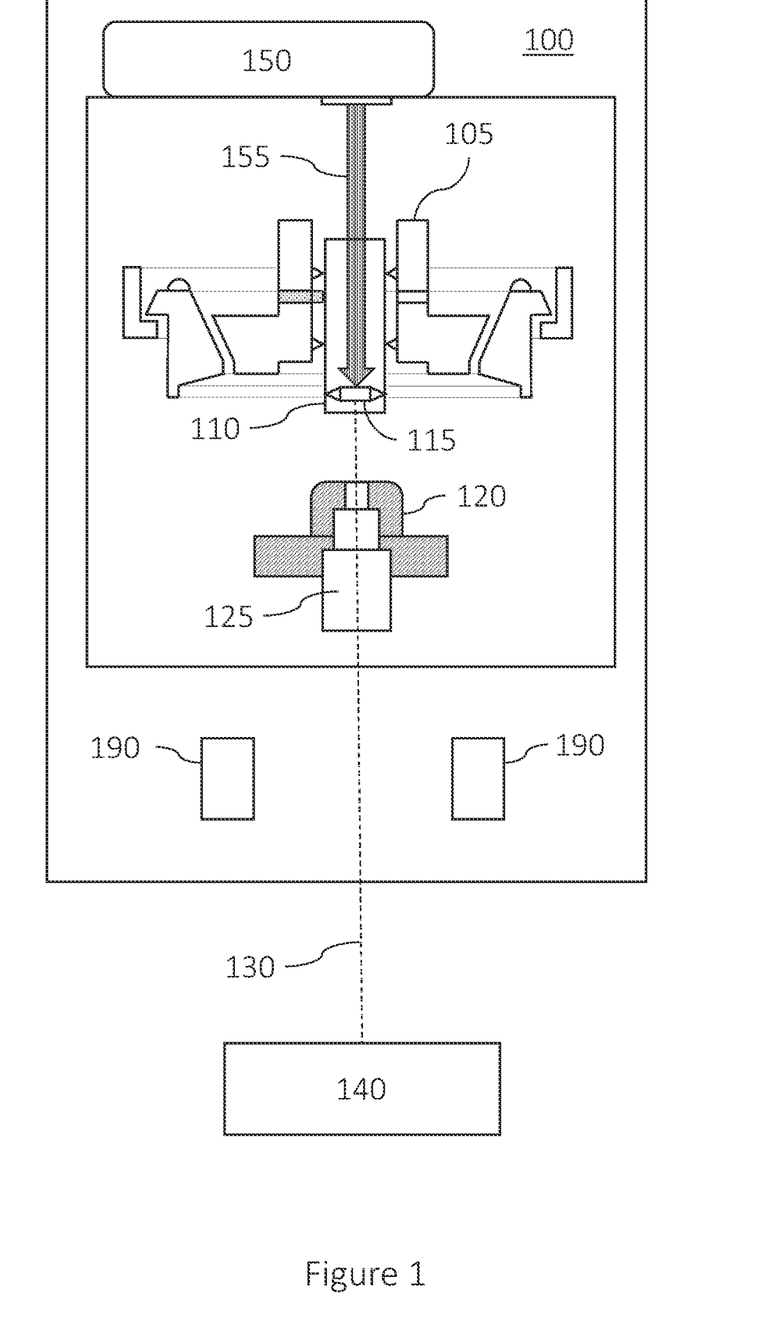
FIG. 1 schematically shows an embodiment of an electron beam source.

FIG. 1 schematically shows an embodiment of an electron beam source 100. The electron beam source 100 comprises a laser 150 adapted to generate a laser beam 155 to heat the back side of a charged particle emitter 115 mounted in a cathode holder system 105 in a vacuum chamber. The charged particle emitter 115, when radiated with the laser beam 155, emits an electron beam 130 into a charged particle channel 125 of an anode 120. In order to control the direction of the electron beam 130, the electron beam source 100 also comprises at least one deflection coil 190. In embodiments, the laser 150 is a $CO_2$ laser. In operation, a high voltage in the range of for example 60 kV is applied over the cathode 110 and the anode 120 in a per se known manner.

If the electron beam source 100 is used for electron beam powder bed fusion, the electron beam 130 is directed onto a powder bed 140. The electron beam source 100 schematically shown in FIG. 1 is thus adapted to use at least one deflection coil 190 to direct an electron beam 130 generated by a back heated charged particle emitter 115 of a cathode 110 onto a powder bed 140 via an anode 120, and thereby manufacture a three-dimensional product by selective fusion of layer by layer of the powder in the powder bed 140 using the electron beam 130.

Figure 2:
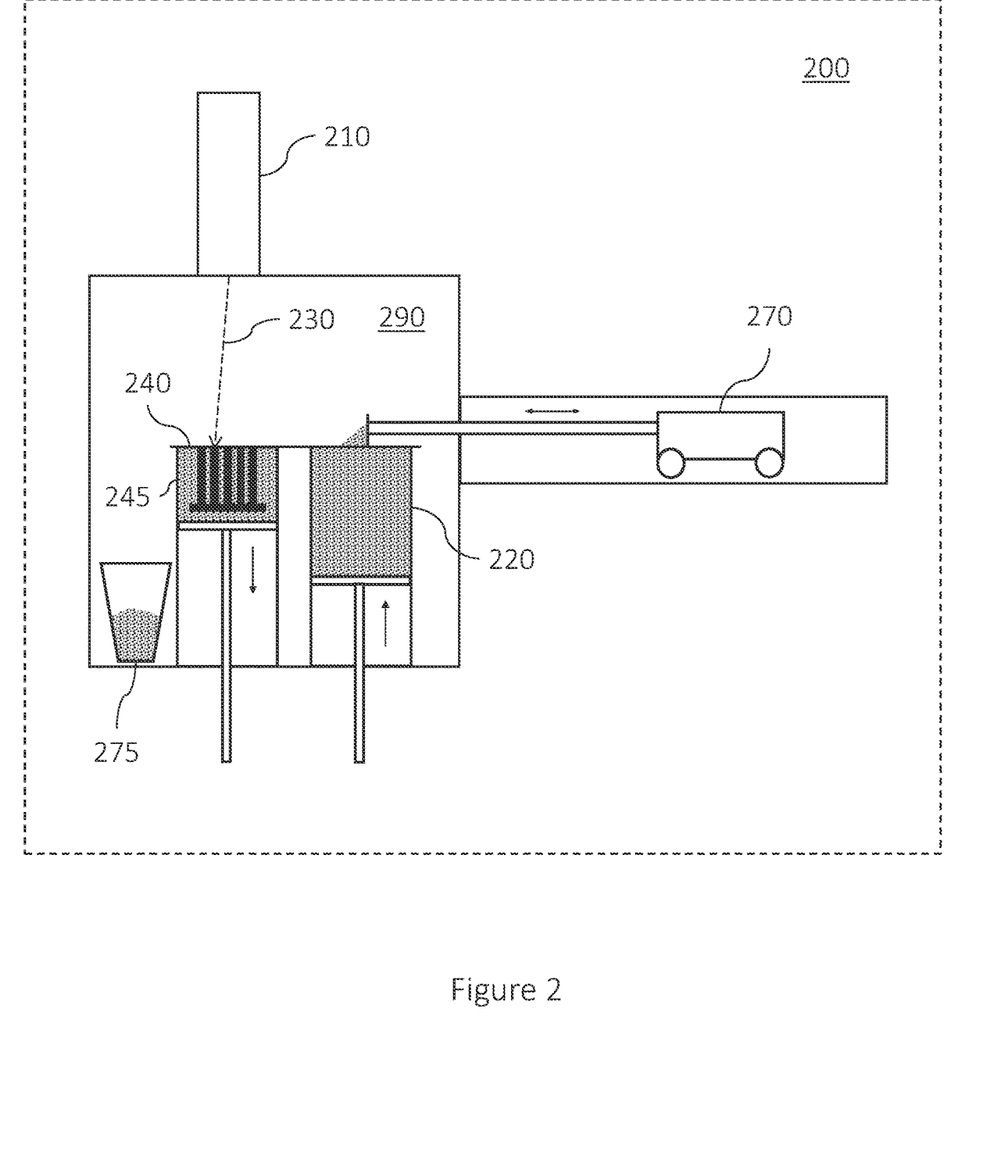
FIGS. 2-4 each schematically illustrate an arrangement for additive manufacturing by selective fusion of a three-dimensional product from a powder bed comprising successively formed powder layers, in accordance with one or more embodiments described herein.

FIG. 2 schematically illustrates an arrangement 200 for additive manufacturing by selective fusion of layers of a three-dimensional product from a powder bed comprising successively formed powder layers 240, in accordance with one or more embodiments described herein. The powder layer 240 may comprise powder material of any kind, such as e.g. powder composed of pure metal, metal alloys, intermetallics, ceramics, glass, graphite, diamond, composites, polymers, nanomaterials, ionic compounds, or any powder mixture thereof. The powder layer 240 may comprise a conductive material, a semi-conductive material, an insulating material, or any mixture thereof.

The powder layer 240 is the top layer in a powder bed comprised in a build tank 245. The powder layer 240 may be formed by powder being distributed from a powder tank 220 using a recoater mechanism, but it may also be formed in other ways. If a recoater mechanism is used, it may e.g. be in the form of a powder layer distributing member or recoater 270, which may e.g. be a linear actuator for distributing powder at the powder bed. The additive manufacturing arrangement 200 may also comprise a spillover bin 275, where spillover powder may be collected.

The additive manufacturing arrangement 200 shown in FIG. 2 comprises an energy beam source 210. The energy beam source 210 may emit any type of energy beam 230 that may be used for selective fusion. The energy beam source 210 may e.g. be an electron beam source, such as e.g. the electron beam source 100 schematically shown in FIG. 1. In that case, the energy beam 230 is an electron beam. However, the energy beam 230 may also be e.g. a laser beam. Additive manufacturing preferably takes place in a vacuum chamber 290.

Electron beam powder bed fusion normally takes place in vacuum, and the electron beam may operate in several process steps: it may preheat the powder layers to a semi-sintered state, fuse the powder by melting or solidifying the powder in the powder layers, and add additional heat to the powder bed to maintain a predetermined temperature of the powder bed throughout the build. These process steps are preferably carried out under computer control to achieve predetermined quality requirements of the manufactured objects.

In an electron beam powder bed fusion process, such as an additive manufacturing process for metal parts, the powder bed may be preheated for semi-sintering of the powder to reduce the risk for later levitation of charged powder and to increase the electrical conduction in the powder bed for increased transportation of electrons from the powder bed. To save time, it is desired to preheat the powder bed with an efficient heating method without risk for levitation and scattering of powder particles due to charging during the preheating. It is normally desired to maximize the power per area when heating the powder bed, to achieve a time efficient heating of the powder bed. Once the powder bed has been heated and the powder has been semi-sintered, the risk for electrostatic levitation and scattering of powder has been reduced.

Heating of the powder bed before fusion of the powder can be performed in many different ways, e.g. by electron beam irradiation or by heat radiation, such as e.g. infrared radiation, from a hot surface. Heating by means of heat radiation is an efficient way of heating a powder bed in a vacuum chamber. In the heating process step, the powder bed may be irradiated with more total energy than the total energy used for fusion of powder in the selected region for manufacturing of the three-dimensional component.

When a powder bed is heated with heat radiation from a heat source, it is desired to achieve an optimized heating area defined by the size, shape, and location of the hot surface. This heating method by a heated surface needs to consider time, surface temperature, radiation efficiency, and how well the radiated heat will be absorbed by the powder bed.

The present disclosure enables the heating of a powder bed by heat radiation from a heating element facing the powder bed. In additive manufacturing, it is desirable to heat the powder bed in a controlled manner before a region of the powder layer of the powder bed is fused or melted. By heating of the powder bed from a heating element, a process temperature can be achieved, providing the advantage that less energy needs to be irradiated towards the powder bed in the subsequent fusion step to achieve solidified material. Other reasons for heating may be to dissolve surface oxides from the powder grains. By heating of the powder bed, the powder may become semi-sintered for increased electrical conductivity, which is advantageous for improved transport of electrons from the electron bed in the consequent fusion step of the manufacturing process. By heating of the powder bed, the electrical conductivity is increased. By heating of the powder bed, also the thermal conductivity may be increased, for more efficient fusion of the powder in subsequent process steps. When the powder bed has been semi-sintered, the powder is less prone to be electrostatically charged, due to increased electrical conduction in the powder bed. Hence, the risk for levitation and scattering of charged powder particles will be reduced in the additive manufacturing process.

An advantage of heating the powder bed using heat radiation from a heating element, instead of using e.g. the electron beam, is that the heat radiation from the heating element does not add electric charge into the powder bed. This means that the powder bed stays stagnant while being semi-sintered by the heat radiation. Heating by an electron beam, on the other hand, adds electric charge, which may make the powder particles move prior to the semi-sintering, leading to a lower effective density of the semi-sintered powder. In additive manufacturing processes, it is normally desirable to achieve as high effective density as possible.

An additional advantage of heating the powder bed using a heating element is that the heating element may be used also for heating the powder bed after the build process is finished, and/or after the fusion of each layer. In this way, the cooling rate of the manufactured component may be slowed down, which may benefit the final material properties.

When the heating element is in the powder bed heating position, it may also protect the powder bed from exposure to residual gases in the vacuum environment. This may be advantageous for reactive powder materials which pick up contaminations easily, such as e.g. titanium powder, which in vacuum is prone to react with residual gas molecules such as $N_2$, $O_2$ and $H_2O$.

An efficient powder bed heating by means of a hot surface of a heating element kept in position above the powder bed, so that the hot surface of the heating element faces the powder bed, is disclosed. The heating element may e.g. be heated by an electron beam radiating the heating element on an upper surface opposite to the hot surface facing the powder bed.

The time period for heating the powder bed may be calculated based e.g. on the powder material properties, at what temperature the subsequent manufacturing process takes place, and/or the degree of sintering needed for the subsequent process. It is normally advantageous to minimize the time for heating the powder bed, since this will reduce the manufacturing time.

Figure 3:
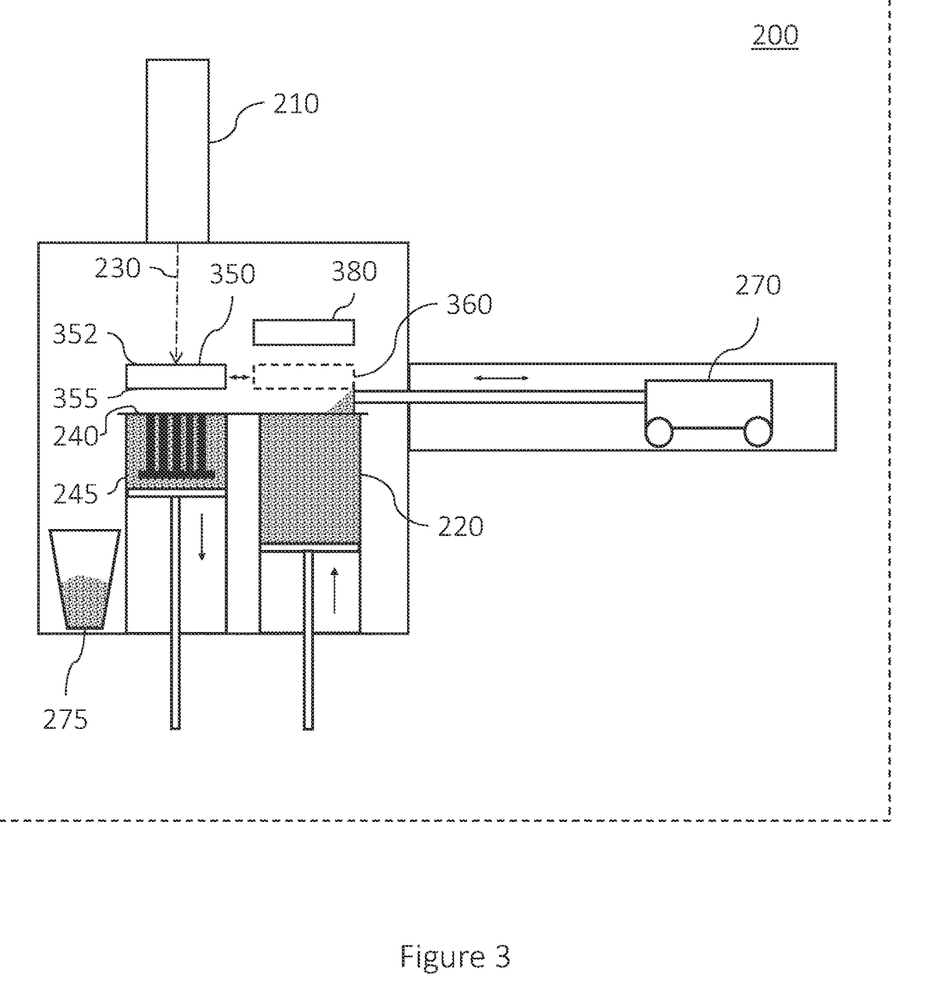
Figure 4:
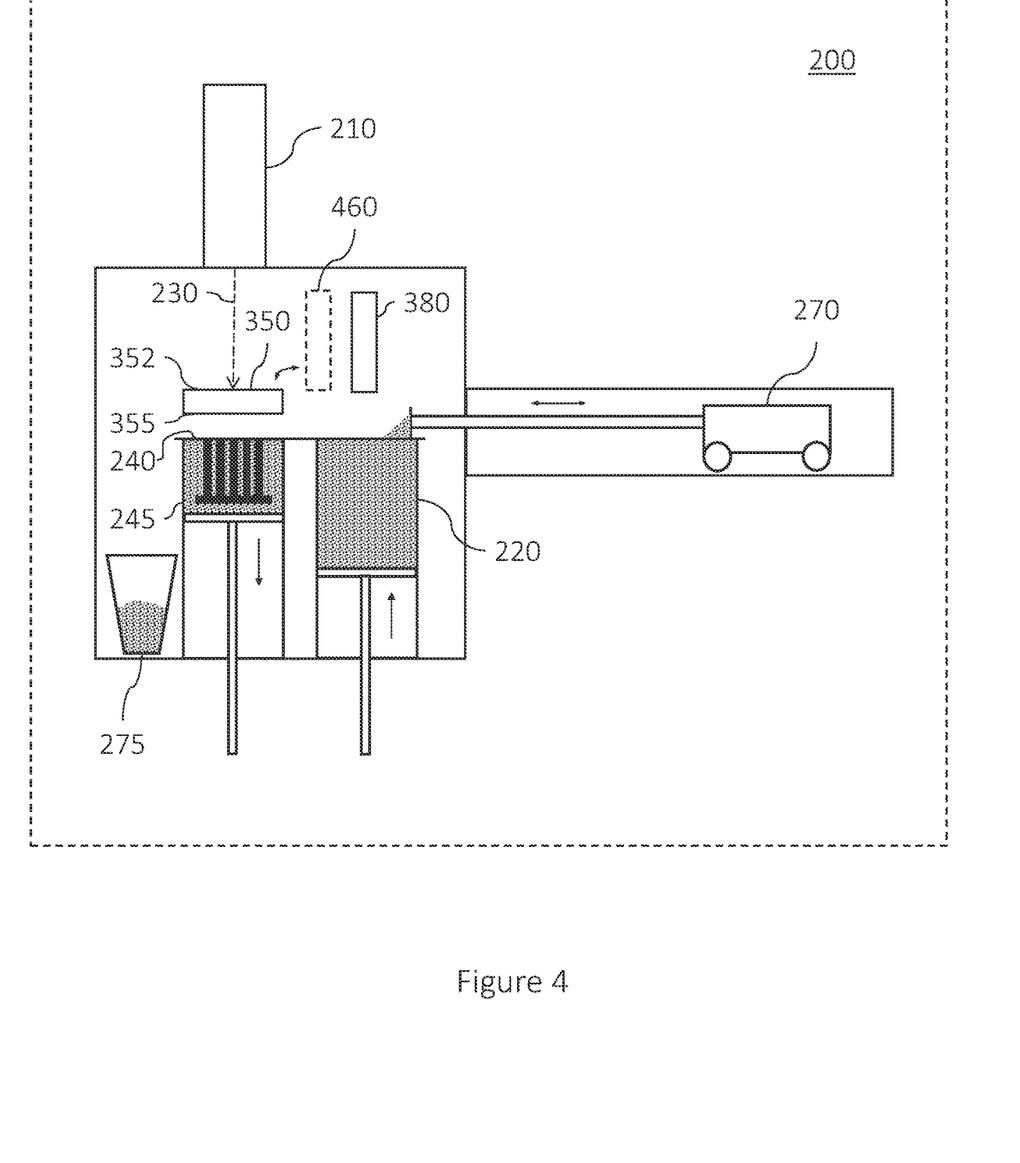

FIGS. 3 and 4 schematically illustrate an arrangement 200 for additive manufacturing by selective fusion of layers of a three-dimensional product from a powder bed comprising successively formed powder layers 240, in accordance with one or more embodiments described herein. The powder layer 240 may comprise powder material of any kind, such as e.g. powder composed of pure metal, metal alloys, intermetallics, ceramics, glass, graphite, diamond, composites, polymers, nanomaterials, ionic compounds, or any powder mixture thereof. The powder layer 240 may comprise a conductive material, a semi-conductive material, an insulating material, or any mixture thereof. Thanks to the disclosed heating of the powder layer, also materials which are not particularly conductive may be used for powder bed fusion.

The additive manufacturing arrangement 200 schematically illustrated in FIGS. 3 and 4 is similar to the additive manufacturing arrangement 200 shown in FIG. 2, but also comprises a heating element 350 arranged in a powder layer heating position above the powder layer 240. The powder layer heating position may be in close proximity to the powder layer 240, such as e.g. less than 20 mm, and preferably less than 10 mm, above the powder layer 240, in order to transfer uniform heat radiation to the powder layer 240. However, it is preferred for the powder layer heating position not to be so close that the heating element 350 comes in physical contact with the powder layer 240, because the heating element 350 and the powder layer 240 may then contaminate each other.

The heating element 350 preferably has a powder layer facing surface 355 that faces the powder layer 240, so that heat radiation emitted from the heating element 350 may heat the powder layer 240, before the selective fusion of the three-dimensional product from the powder layer 240. The heating preferably takes place in vacuum. The powder layer facing surface 355 of the heating element 350 preferably faces at least areas of the powder layer 240 that correspond to the cross section of the layer of the three-dimensional product to be formed using the powder layer 240.

The heating element 350 may have almost any shape, as long as it has a powder layer facing surface 355 that can emit heat radiation towards the powder layer 240. The heating element 350 may e.g. be concave, convex, hemispherical or lens shaped. The heating element 350 may also have a shape with hole(s), such as e.g. a ring, a torus or a perforated body.

The powder layer facing surface 355 of the heating element 350 may be essentially flat, but it may have any shape, such as e.g. ribbed or sawtooth-shaped. The powder layer facing surface 355 of the heating element 350 may be parallel to at least a part of the powder layer 240, but this is not necessarily the case, as long as the heating element 350 can emit heat radiation towards the powder layer 240.

The heating element 350 does not have to be an integral body. The heating element 350 may instead e.g. comprise a number of plates or sheets. The heating element 350 may e.g. comprise a thin sheet or foil. This may decrease the time and energy required for heating the heating element 350, due to less mass. Such a thin sheet or foil is preferably arranged in some kind of frame for structural support, since a thin sheet or foil may otherwise be deformed during heating.

The heating element 350 may e.g. be heated by the energy beam 230 being scanned over the upper surface 352 of the heating element 350, i.e. the surface opposite to the powder layer facing surface 355. The scanning of the energy beam 230 may be controlled according to a predetermined pattern. Alternatively, the energy beam 230 may be defocused to cover a substantial area of the upper surface 352 of the heating element 350, in which case it may not be necessary to scan the energy beam 230 over the upper surface 252.

The heating element 350 preferably comprises a material with a high melting point, such as e.g. a refractory metal or graphite. In embodiments, the heating element 350 is kept at a positive potential, such as e.g. +60 kV, at least when the heating element 350 is in the powder layer heating position. This may attract the energy beam 230 and further increase its heating power, especially when the energy beam 230 is an electron beam.

The heat radiation from the heating element 350 is preferably infrared radiation. In embodiments, the powder layer facing surface 355 of the heating element 350 is coated with a material with higher efficiency of heat radiation than the material of the heating element 350.

The heating element 350 may be arranged to be moveable from the powder layer heating position above the powder layer 240 to a resting position 360, 460. The resting position 360, 460 may be a position to the side of the powder layer heating position, to which the heating element 350 may e.g. be horizontally moved, as schematically illustrated in FIG. 3. If the additive manufacturing arrangement 200 comprises a powder distributing member 270 arranged to distribute powder to form a new powder layer 240, the powder distributing member 270 may be arranged to, after each fusion step, also move the heating element 350 between the powder layer heating position and the resting position 360.

Alternatively, the heating element 350 may be moved to a resting position 460 where it acts as a heat shield, e.g. by being tilted up- or downwards or rotated, as schematically illustrated in FIG. 4. In this case, the heating element 350 may collect heat from the fusion process when it is in the resting position 460, which heat can contribute to reduce the time for heating the powder layer 240 when the heating element 350 is in the powder layer heating position.

For ease of illustration, FIGS. 3 and 4 show the resting position 360, 460 being located directly above the powder tank 220, but in most practical cases the resting position 360, 460 would preferably not be located near the powder tank 220, since this could cause an undesired heating or sintering of the powder in the powder tank 220.

The additive manufacturing arrangement 200 preferably comprises an energy beam source 210 that emits an energy beam 230 used for selective fusion of layer by layer of the powder layer 240 into a three-dimensional product. The energy beam 230 may in this case be used also for heating the heating element 350, preferably by heating an upper surface 352 of the heating element 350 that faces away from the powder layer 240. In this case, the heating element 350 must be moved to the resting position 360, 460 before fusion of a powder layer 240. During the selective fusion of the three-dimensional product, the heating element 350 is then preferably moved back to the powder layer heating position in order to heat a new powder layer 240, and then back to the resting position 360, 460 to allow the energy beam 230 to reach the powder layer 240 for further fusion. The energy beam 230 is preferably an electron beam, but other energy beams 230, such as e.g. laser beams, may also be used.

Alternatively or additionally, the heating element 350 may be heated by a heating device 380, preferably when the heating element 350 is in the resting position 360, 460. The heating device 380 may e.g. be arranged to heat the heating element 350 in the resting position 360, 460 using IR heating, resistive heating, inductive heating, laser beam heating, electron beam heating, and/or conductive heating by physical contact with the heating element 350. If the heating element 350 is heated in the resting position 360, 460, it may be preferred to use a thicker heating element 350, in order to enable it to accumulate more energy before it is moved to the powder layer heating position.

In embodiments, the heating element 350 is connected to a temperature sensor for measuring the temperature of the heating element 350. The measured temperature may be used as an overheating protection, and/or for feedback for controlling the energy beam 230 or heating device 380 used for heating the heating element 350. It is also possible to use e.g. a remote pyrometer or an IR camera for measuring the temperature of the heating element 350.

The heating element 350 may be surrounded by heat reflecting devices in the resting position 360, 460, so that the cooling rate of the heating element 350 is reduced. Such heat reflecting devices may e.g. be single or multiple layers of metal foil.

In embodiments, the heating element 350 is thermally insulated, to prevent heat loss.

The upper surface 352 of the heating element 350 preferably has a structure that increases the efficient area of the upper surface 352. Alternatively or additionally, the upper surface 352 of the heating element 350 may be coated with a material with lower efficiency of heat radiation than the material of the heating element 350. Alternatively or additionally, the upper surface 352 of the heating element 350 may be coated with a material with lower efficiency of electron emission than the material of the heating element 350. In embodiments, the heating element 350 is electrically grounded, to avoid build-up of electric charge in the heating element 350. In embodiments, the heating element 350 is kept at a positive potential, such as e.g. +60 kV, at least when the heating element 350 is in the powder layer heating position. This may attract the energy beam 230 and further increase its heating power, especially when the energy beam 230 is an electron beam.

Additive manufacturing equipment may have heat shields around the powder bed, where the solidification process takes place. These heat shields prevent heat from disappearing from the powder bed. It may be advantageous to combine such heat shields with the heating element 350, to achieve an efficient heating of the powder layer 240.

If the heating element 350 is not an integral body, but instead e.g. comprises a number of plates or sheets, it does not have to be moveable as a whole to a single resting position 360, 460. Instead, different parts of the heating element 350 may in this case be moved to different resting positions 360, 460. If the heating element 350 is moved to a resting position 460 where it acts as a heat shield, the heating element 350 may in the resting position 460 be divided into different parts of the heat shield, that are moved into different resting positions 460 surrounding the powder layer 240.

As explained above, the heating element 350 may be movable between at least two positions. In a powder layer heating position, the upper surface 352 of the heating element 350 may be irradiated by the energy beam 230, while the powder layer facing surface 355 irradiates the powder layer 240 with heat radiation. In the resting position 360, 460, the heating element 350 may be out of way of the energy beam 230 irradiating the powder layer 240. Hence, when the heating element 350 is in the resting position 360, 460, it is possible to melt, fuse, and heat the powder layer 240 directly with the energy beam 230. When the heating element 350 is in the powder layer heating position, it is possible to indirectly heat the powder layer 240 with the energy beam 230 via the heating element 350.

In an embodiment, the heating element 350 is horizontally moved into the powder layer heating position by a linear actuator, as schematically illustrated in FIG. 3. This movement could be done with the heat shields remaining in position. The heating element 350 may e.g. be arranged on the powder layer distributing member or recoater 270, which may be a linear actuator for distributing powder at the powder bed. This reduces the number of movable actuators.

In another embodiment, the heating element 350 is moved to a resting position 460 where it acts as a heat shield, as schematically illustrated in FIG. 4. In this case, the heating element 350 may collect heat from the solidification process when it is in the resting position 460, which heat can contribute to reduce the time for heating the powder layer 240 when the heating element 350 is in the powder layer heating position and is heated by the energy beam 230.

The heating element 350 may also be heated by a separate heating device 380, in the resting position 360, 460 before it is moved to the powder layer heating position. The separate heating device 380 may for example be an electric, resistive, inductive, conductive, electron beam, or laser heating source. The separate heating device 380 may heat the heating element 350 in different ways, e.g. using IR heating, resistive heating, inductive heating, laser beam heating, electron beam heating, and/or conductive heating by physical contact with the heating element 350. Heating from different heating sources may also be combined, so that the heating element 350 may be heated in the resting position 360, 460 using one heat source and heated by energy beam 230 in the powder layer heating position. In embodiments, the heating element 350 comprises the heating device 380.

In embodiments, the heating element 350 is heated by the same energy beam 230 that is used for the fusion of the powder bed. The heating may e.g. be done by the energy beam 230, e.g. an electron beam, in a defocused mode.

Figure 5:
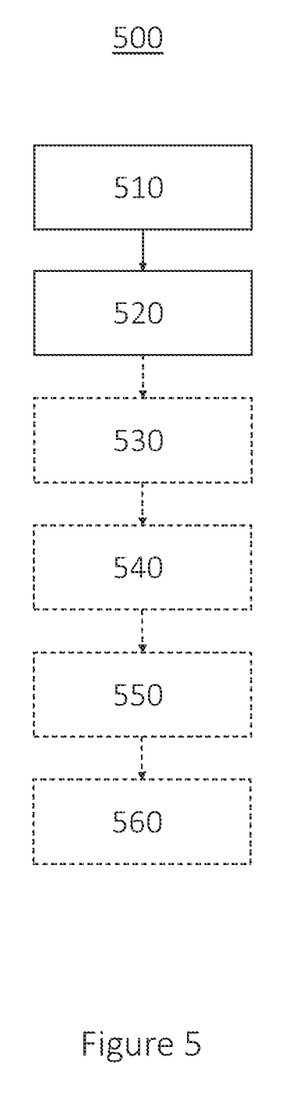
FIG. 5 schematically illustrates a method for heating a powder layer in connection with additive manufacturing by selective fusion of a three-dimensional product from a powder bed comprising successively formed powder layers, in accordance with one or more embodiments described herein.

FIG. 5 schematically illustrates a method 500 for heating a powder layer in connection with additive manufacturing by selective fusion of layers of a three-dimensional product from a powder bed comprising successively formed powder layers 240. The method 500 may comprise:

Step 510: arranging a heating element 350 having a powder layer facing surface 355 in a powder layer heating position above a powder layer 240.

Step 520: heating at least a part of the powder layer 240 with heat radiation from said heating element 350 before the selective fusion of a layer of the three-dimensional product.

The powder layer facing surface 355 may be essentially flat and parallel to at least a part of the powder layer 240, but other shapes are conceivable, as long as the heating element 350 can emit heat radiation towards the powder layer 240.

The method 500 may further comprise at least one of:

Step 530: moving the heating element 350 from the powder layer heating position to a resting position 360, 460 before the selective fusion of a layer of the three-dimensional product from the powder layer 240.

Step 540: heating the heating element 350 in the resting position 360, 460 using IR heating, resistive heating, inductive heating, laser beam heating, electron beam heating, and/or conductive heating by physical contact with the heating element 350.

Step 550: using the energy beam 230 for heating the heating element 350, preferably by heating an upper surface 352 of the heating element 350 that faces away from the powder layer 240, if the selective fusion of the three-dimensional product uses an energy beam 230, preferably an electron beam. The energy beam 230 may also be e.g. a laser beam.

Step 560: keeping the heating element 350 at a positive potential, such as e.g. +60 kV, at least when the heating element 350 is in the powder layer heating position. This may attract the energy beam 230 and further increase its heating power, especially when the energy beam 230 is an electron beam.

In embodiments, the heating element 350 is moved between the powder layer heating position and the resting position 360, 460 using a powder distributing member 270 arranged to distribute powder to form the powder layer 240.

In embodiments, the selective fusion of the three-dimensional product uses an energy beam 230, preferably an electron beam. The energy beam 230 may also be e.g. a laser beam.

In embodiments, the heat radiation from the heating element 350 is infrared radiation.

In embodiments, the heating element 350 comprises a thin sheet or foil.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. Arrangement for additive manufacturing by selective fusion of layers of a three-dimensional product from a powder bed comprising successively formed powder layers, wherein an energy beam is used in the selective fusion of the three-dimensional product, the arrangement comprising:
   a heating element having a powder layer facing surface, arranged to be moved into a powder layer heating position above a powder layer, in such a way that heat radiation emitted from said heating element heats at least a part of the powder layer before the selective fusion of a layer of the three-dimensional product from the powder layer, wherein the energy beam is used for heating the heating element by heating an upper surface of the heating element that faces away from the powder layer to thereby preheat the powder bed in a controlled manner before a region of the powder layer of the powder bed is fused or melted when the heating element is in the powder layer heating position.

2. The arrangement according to claim 1, wherein the heating element is arranged to be moveable from the powder layer heating position to a resting position before the selective fusion of a layer of the three-dimensional product from the powder layer.

3. The arrangement according to claim 2, further comprising a powder distributing member arranged to distribute powder to form the powder layer, wherein the powder distributing member is arranged to move the heating element between the powder layer heating position and the resting position.

4. The arrangement according to claim 2, further comprising a heating device arranged to heat the heating element in the resting position using IR heating, resistive heating, inductive heating, laser beam heating, electron beam heating, and/or conductive heating by physical contact with the heating element.

5. The arrangement according to claim 1, wherein the heating element is kept at a positive potential, at least when the heating element is in the powder layer heating position.

6. The arrangement according to claim 1, wherein the heating element comprises a sheet or foil.

7. A method for heating a powder layer in connection with additive manufacturing by selective fusion of layers of a three-dimensional product from a powder bed comprising successively formed powder layers, wherein an energy beam is used in the selective fusion of the three-dimensional product the method comprising:
   moving a heating element having a powder layer facing surface into a powder layer heating position above a powder layer; and
   heating at least a part of the powder layer with heat radiation from said heating element before the selective fusion of a layer of the three-dimensional product from the powder layer, wherein the energy beam is used for heating the heating element by heating an upper surface of the heating element that faces away from the powder layer to thereby preheat the powder bed in a controlled manner before a region of the powder layer of the powder bed is fused or melted when the heating element is in the powder layer heating position.

8. The method according to claim 7, further comprising moving the heating element from the powder layer heating position to a resting position before the selective fusion of a layer of the three-dimensional product from the powder layer.

9. The method according to claim 8, wherein the heating element is moved between the powder layer heating position and the resting position using a powder distributing member arranged to distribute powder to form the powder layer.

10. The method according to claim 8, further comprising heating the heating element in the resting position using IR heating, resistive heating, inductive heating, laser beam heating, electron beam heating, and/or conductive heating by physical contact with the heating element.

11. The method according to claim 7, further comprising keeping the heating element at a positive potential, at least when the heating element is in the powder layer heating position.

12. The method according to claim 7, wherein the heating element comprises a sheet or foil.

* * * * *